(12) United States Patent
Brehm (10) Patent No.: US 10,882,477 B2
(45) Date of Patent: Jan. 5, 2021

(54) CONTACTING SYSTEM FOR ELECTRICALLY CONNECTING A VEHICLE ELECTRICAL SYSTEM OF A MOTOR VEHICLE TO A REMOVABLE VEHICLE SEAT OR A SEAT SYSTEM

(71) Applicant: Magna Seating (Germany) GmbH, Sailauf (DE)

(72) Inventor: Christoph Brehm, Muenster (DE)

(73) Assignee: MAGNA SEATING (GERMANY) GMBH, Sailauf (DE)

( * ) Notice: Subject to any disclaimer, the term of this patent is extended or adjusted under 35 U.S.C. 154(b) by 121 days.

(21) Appl. No.: 16/390,102

(22) Filed: Apr. 22, 2019

(65) Prior Publication Data
US 2019/0337471 A1  Nov. 7, 2019

(30) Foreign Application Priority Data

May 5, 2018  (DE) .......................... 10 2018 207 170

(51) Int. Cl.
| | | |
|---|---|---|
| *B60N 2/02* | (2006.01) | |
| *B60R 16/027* | (2006.01) | |
| *B60N 2/07* | (2006.01) | |
| *B60N 2/08* | (2006.01) | |

(52) U.S. Cl.
CPC .......... *B60R 16/027* (2013.01); *B60N 2/0244* (2013.01); *B60N 2/072* (2013.01); *B60N 2/08* (2013.01); *B60N 2002/0264* (2013.01)

(58) Field of Classification Search
CPC ... H01L 2924/0105; H01L 2924/01082; H01L 2924/0132; H01L 2924/00; H01L 2924/00014; B60N 2/286; B60N 2/2821; B60N 2/2839; B60N 2/3011; B60N 2/01583
See application file for complete search history.

(56) References Cited

U.S. PATENT DOCUMENTS 7,147,261 B2 * 12/2006 Ventura .................. B60N 2/002
  296/65.13
7,400,947 B2 *  7/2008 Endo ...................... B60N 2/002
  701/1

(Continued)

FOREIGN PATENT DOCUMENTS

DE    60308424 T2    9/2007
EP     2298609 B1   12/2012

(Continued)

*Primary Examiner* — Kiran B Patel
(74) *Attorney, Agent, or Firm* — Jordan IP Law, LLC; Todd A. Vaughn (57) ABSTRACT

A contact system to establish an electrical connection between a vehicle electrical system and a vehicle seat. The contact system includes a contact rail and at least one contact socket attached to the vehicle seat. The contact rail has at least two contact strips connected to the vehicle electrical system, while the contact socket has a sliding unit with contact elements movably retained in a housing unit. A relative movement between the sliding unit and the housing unit is carried out to electrically connect to the vehicle electrical system when the vehicle seat is retained in the guide rails. Removal of the electrical contact is achieved upon removal of the vehicle seat from the guide rails.

20 Claims, 9 Drawing Sheets

(56) References Cited

U.S. PATENT DOCUMENTS

| | | | |
|---|---|---|---|
| 7,614,597 B2* | 11/2009 | Matsumoto | B60N 2/0705 248/429 |
| 8,393,590 B2* | 3/2013 | Kato | B60N 2/0702 248/394 |
| 8,814,122 B2* | 8/2014 | Couasnon | B60N 2/0244 248/429 |
| 8,937,250 B2* | 1/2015 | Terada | B60N 2/0715 174/72 A |
| 9,024,190 B2* | 5/2015 | Terada | B60R 16/0215 174/72 A |
| 9,315,118 B2* | 4/2016 | Tuji | B60N 2/067 |
| 9,511,685 B2* | 12/2016 | Enokijima | B60N 2/067 |
| 9,731,629 B2* | 8/2017 | Yamada | B60N 2/0705 |
| 9,802,511 B2* | 10/2017 | Matsushima | B60N 2/0705 |
| 10,081,271 B2* | 9/2018 | Goto | B60N 2/123 |
| 10,144,310 B1* | 12/2018 | Ferenc | B60N 2/067 |
| 10,214,168 B1* | 2/2019 | Yamamoto | B60R 22/34 |
| 10,336,273 B2* | 7/2019 | Lanter | B60R 21/01554 |
| 10,513,203 B2* | 12/2019 | Ito | B60N 2/0705 |
| 10,569,669 B2* | 2/2020 | Dry | B60N 2/07 |
| 2008/0238126 A1* | 10/2008 | Koga | B60N 2/067 296/65.13 |

FOREIGN PATENT DOCUMENTS

| | | | |
|---|---|---|---|
| EP | 3150426 A1 | 4/2017 | |
| WO | 0187665 A1 | 11/2001 | |

\* cited by examiner

CONTACTING SYSTEM FOR ELECTRICALLY CONNECTING A VEHICLE ELECTRICAL SYSTEM OF A MOTOR VEHICLE TO A REMOVABLE VEHICLE SEAT OR A SEAT SYSTEM

CROSS-REFERENCE TO RELATED APPLICATIONS

The present application claims priority 35 U.S.C. § 119 to German Patent Publication No. DE 102018207170.5 (filed on May 5, 2018), which is hereby incorporated by reference in its complete entirety.

TECHNICAL FIELD

Embodiments relate to a contact system for electrically connecting a vehicle electrical system of a motor vehicle to a removable vehicle seat or a seat system.

BACKGROUND

Vehicle seats for drivers and passengers are movable longitudinally for adjusting an optimum seat position via a rail system comprising two mutually parallel pairs of seat rails disposed on the floor of the motor vehicle. The position of the seat can be locked via the locking means that is disposed in the vicinity of the pairs of seat rails, wherein the locking can be released via operating levers by an occupant and the seat can be displaced along the rail on the vehicle.

To increase the load area, it is furthermore known to join said longitudinally movably mounted vehicle seats, in particular, of the 2nd and 3rd rows of seats, to the floor of the vehicle in a reversible manner. Such a fastening system for vehicle seats is known from European Patent Publication No. EP 0 949 111 B1, for example. This modular fastening system comprises a cam controller for displacement of the vehicle seat in the longitudinal direction and an arrangement for locking the seat in the adjusted position. A control cam that can be operated via an operating lever causes swivelling of the locking means. This enables locking of the vehicle seat in the rails, releasing of the vehicle seat for the purpose of longitudinal displacement and adjusting a position of the components of the fastening system in which removal of the vehicle seat is possible.

Additionally, motor vehicle seats are often equipped with functions that require an electrical connection to the vehicle electrical system of the motor vehicle. One such function is for example seat heating or electrical adjustability of the seat height and seat depth. With removable motor vehicle seats, said electrical connection must also be reversible and in the case of reinsertion of the vehicle seat it must be easy to re-establish reliable contacting of the electrical connection. This is especially difficult and structurally complex if the motor vehicle seat is longitudinally movably joined to the floor of the vehicle and is designed so that the seat can be removed and reinserted at any position along the rail system. Here it must be ensured that contacting is possible between the vehicle power supply and the motor vehicle seat in any position of the vehicle seat along the floor rail.

A fastening system and electrification of a vehicle seat are known from European Patent Publication No. EP 2 298 609 B1. In this case, the fastening system comprises a slide rail that is joined to the structure of the vehicle and that comprises anchoring vanes. At least one anchoring mechanism that is associated with each slide rail is disposed on the structure of the seat, wherein the anchoring mechanism comprises a latch that can be displaced between a retracted position in which the anchoring mechanism can be inserted into the rail and a deployed position in which the latch engages the anchoring vanes and the seat is locked in the rail and held in contact. Furthermore, the fastening system comprises a movable support comprising a contact pin. The support is mounted so as to be pivotable about an axis of rotation such that it can be swivelled into a position in which contact is made between the contact pin of the support and a conducting track on the rail and into a position in which the contact is removed. The swivelling of the support is triggered or caused by the swivelling movement of the latch. The latch comprises a bolt 30 that engages in a corresponding recess 33 of the holder 22, resulting in a positive coupling.

Furthermore, a fastening and contacting system is known from European Patent Publication No. EP 3 150 426 A1. In this case, the fastening system comprises slide rails joined to the slide rail and corresponding holding means, which can cause both locking in the slide rail and contacting. For this purpose, the holding means are implemented similarly to a hinged anchorage, wherein locking means of the hinged anchorage can be brought into engagement with slots in the slide rail via a swivelling movement.

SUMMARY

In accordance with embodiments, it is therefore the object to develop a contact system for electrically connecting a vehicle electrical system of a motor vehicle to a removable, longitudinally movable vehicle seat such that it is structurally simple and that an electrical connection is possible rapidly and automatically, i.e., without additional operation by a user, both when inserting and after a longitudinal displacement of a vehicle seat into any position.

Such embodiments may include a contact system for electrically connecting a vehicle electrical system of a motor vehicle to a removable vehicle seat, wherein the motor vehicle seat comprises a seat structure and current contact elements and can be displaced in the longitudinal direction via guide rails of a rail system fixedly attached to the structure of the vehicle and is removably retained in the guide rails, with a contact rail comprising at least two contact strips connected to the vehicle electrical system and at least one contact socket attached to the structure of the seat, wherein the contact socket comprises a sliding unit with contact elements movably retained in a housing unit and a relative movement between the sliding unit and the housing unit can be carried out for electrically connecting to the vehicle electrical system of the motor vehicle during insertion (vertical direction) of the vehicle seat in the guide rails and by which contact between the current contact elements and the contact strips can be made via the contact elements, and wherein said contact can be removed again when removing the vehicle seat from the guide rails, wherein the relative movement is a combined rotational and translational movement, wherein the rotation is carried out as a function of the translation and is a helical rotary movement between the sliding unit and the housing unit.

In accordance with embodiments, using the contact system to establish an electrical connection between a vehicle electrical system of a motor vehicle and a removable vehicle seat, automatic electrical contact of the vehicle seat is possible when inserting the vehicle seat at any arbitrary position along the guide rail. Removal of the vehicle seat, and thus, the electrical contact, is also correspondingly possible at any position along the rail system. The user himself does not notice any difference from a conventional removable seat (without an electrical connection).

In this case, contact is brought about via a rotary movement of a cylindrical element with contact elements when inserting the vehicle seat. During the rotary movement, the contacts swivel out of a housing of a contact socket and are contacted with the current rail.

When contact the vehicle seat with the vehicle electrical system, both at least one connection to the power supply and at least one data connection can be made.

Still more advantageous embodiments of the present invention are specified in the subordinate claims.

The longitudinal direction corresponds to the x-direction, the lateral direction corresponds to the y-direction and the vertical direction corresponds to the z-direction in the description and the associated drawings.

DRAWINGS

Embodiments will be illustrated by way of example in the drawings and explained in the description below.

DESCRIPTION

A motor vehicle seat (not illustrated) is movable longitudinally via a rail system comprising two mutually parallel pairs of seat rails, i.e., extending in the x-direction and attached to the body of the vehicle. Each of a pair of seat rails comprises a floor rail fixed to the vehicle, i.e., attached to a floor element, and a seat rail on the motor vehicle seat that is longitudinally movably supported on the floor rail.

The position of the vehicle seat is lockable via a locking unit that is disposed in the vicinity of the pairs of seat rails. The locking is released by an occupant, for example, via a pivotably attached longitudinal adjustment lever, and the seat is displaceable along the floor rail that is fixed to the structure. When removing the vehicle seat from the floor rail, a separate seat removal lever is operated that releases both the locking in the longitudinal adjustment direction (x-direction) and in the removal direction (z-direction), to facilitate removal of the seat.

The design of the rail system, the removability of the vehicle seat from the floor rails, the guidance between the floor rail and the seat rail, and the locking in the floor rails are not described in detail, because this is generally known and can be used in different embodiments. Furthermore, the motor vehicle seat also comprises electrical functions that can include a number of electrical loads such as seat heating for example.

Figure 1:
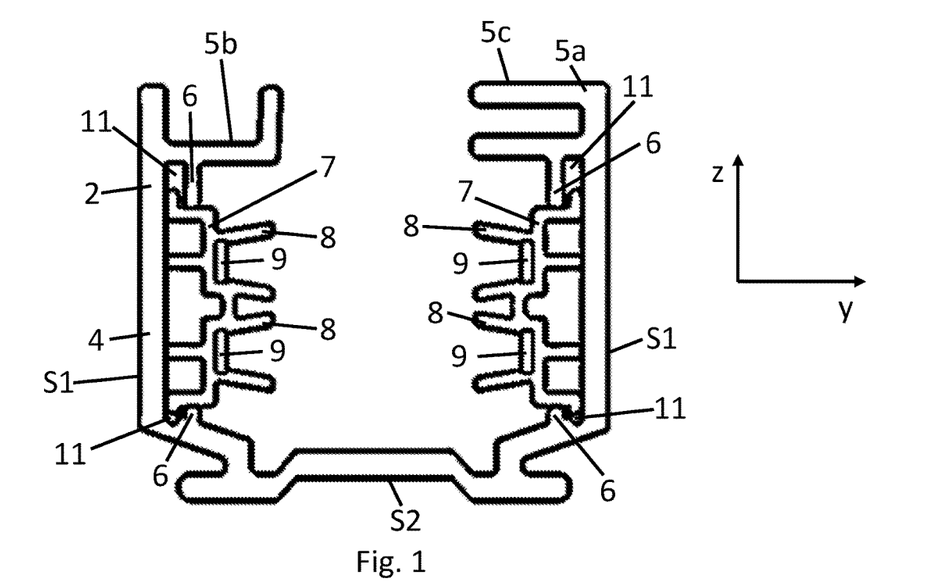
FIG. 1 illustrates a cross-section through a contact rail of the contact system, in accordance with embodiments.
Figure 2:
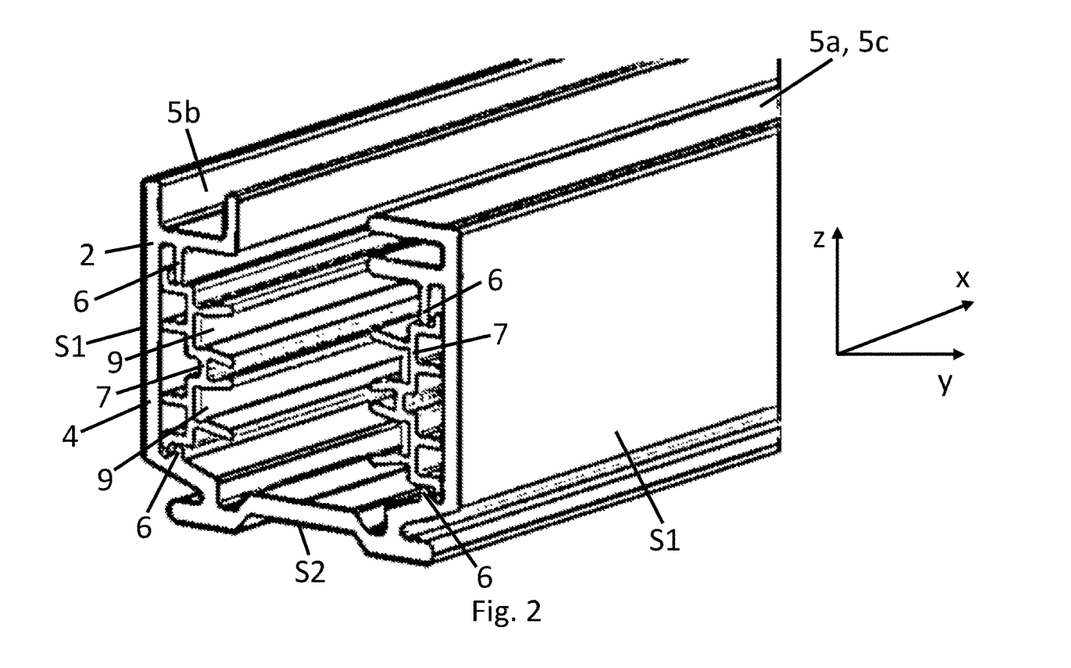
FIG. 2 illustrates a perspective view of a section of the contact rail of FIG. 1.

As illustrated in FIGS. 1 and 2, in accordance with embodiments, a contact system 1 is provided to establish an electrical connection between a vehicle electrical system of a motor vehicle to a removable vehicle seat or a seat system. Such a contact system 1 comprises a contact rail 2 and a contact socket 3 to be received by the contact rail 2. The contact rail 2 also extends in the longitudinal direction and is disposed parallel to and spaced apart from the floor rails. The contact rail 2 is fixed to the structure or body of the motor vehicle, where it is disposed on a floor element of the motor vehicle. The contact rail 2 comprises a support rail 4, which, for example, is made in one piece of an aluminum profile or as a rolled profile. The support rail 4 is essentially implemented having a U-profile or cross-section that comprises spaced apart legs S1 and a bridge piece S2 to join the legs S1 that define a space into which the contact socket 3 is received. The U-profile of the support rail 4 further comprises transversely extending sections 5a and 5b and retaining strips 6 disposed on an interior surface at both sides of the upper end region of the legs S1. The section 5a comprises a stop surface 5c. The retaining strips 6 form guide grooves 11 with the associated legs S1.

The contact rail 2 also comprises insulation profiles 7 embodied as plastic profiles extending in the longitudinal direction on both sides on the inside of a corresponding leg S1. The insulation profiles 7 each comprise a pair of spaced apart grooves 8 that form the contact strips 9 in the base of the groove 8. The contact strips 9 in the base of the groove 8 are embodied as copper strips. As illustrated in the figures, the insulation profiles 7 are retained in the guide grooves 11 via retaining strips. The contact strips 9 are electrically connected to a vehicle system line (not illustrated) of the vehicle electrical system of the motor vehicle. Electrical current and/or electrical signals are to be transmitted via the vehicle system line. The vehicle system line and the connection to the copper strips are not graphically represented.

The end regions of the sections 5a, 5b are spaced at a distance apart from each other in the lateral direction. The sections 5a, 5b form a guide surface for the contact socket 3 that is displaceably supported along the contact rail 2.

In an alternative embodiment, instead of the implementation of a separate contact rail 2 this can even be integrated within the floor rail that is fixed to the motor vehicle.

Figure 6A:
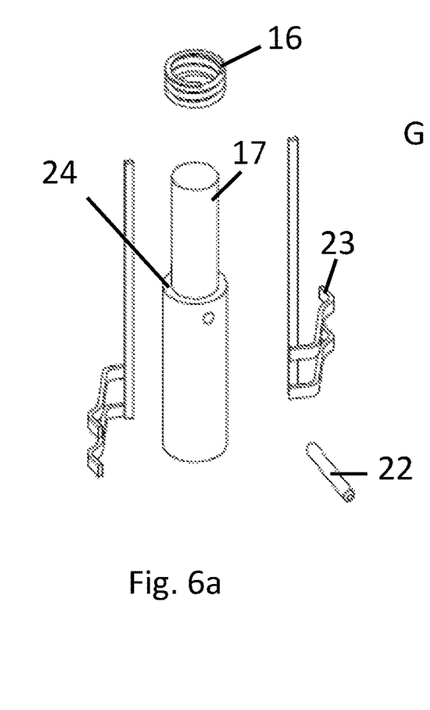
FIGS. 6a to 6b illustrate exploded views of a sliding unit and a contact socket, in accordance with embodiments.
Figure 6B:
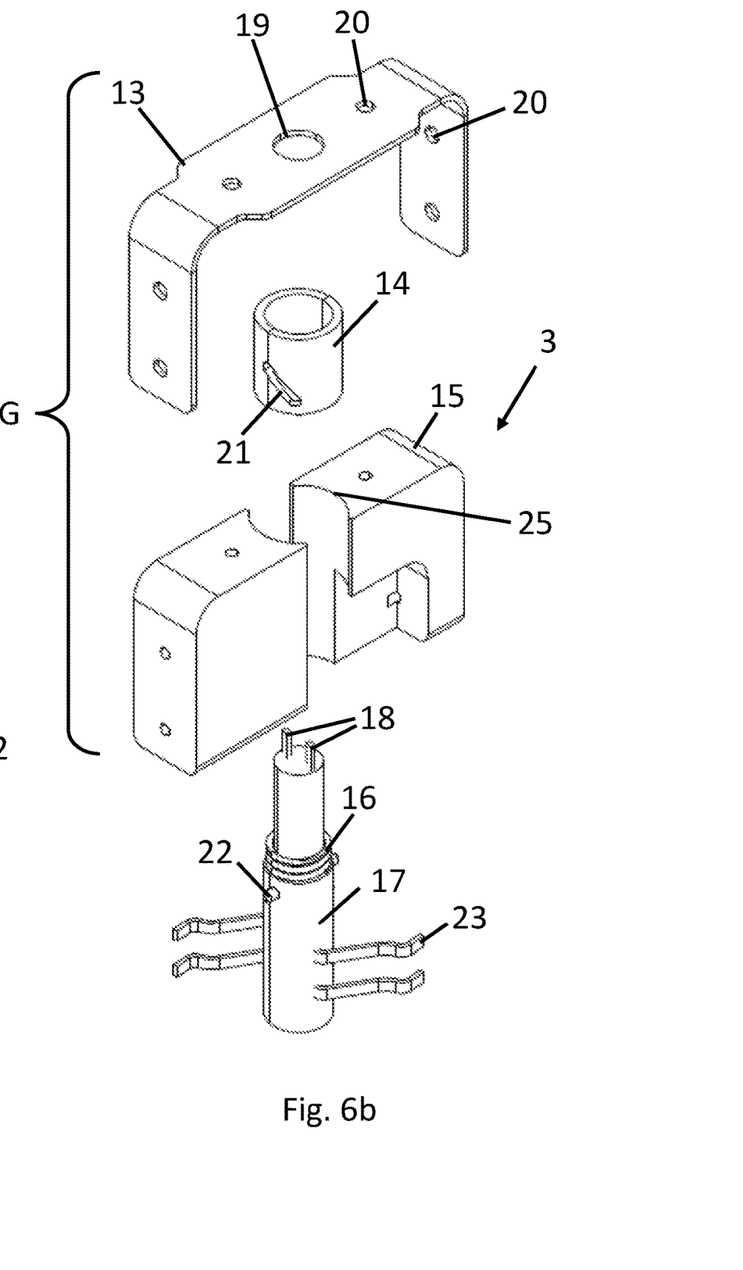

FIG. 6b illustrates the contact socket 3, which is joined to a motor vehicle seat or a structure associated with a bench seat, in an exploded representation. The structure of the seat 12 is indicated schematically in FIGS. 3a to 3c by a plate-shaped element. Basically, the motor vehicle seat is not represented in the drawings. The contact socket 3 comprises a cover frame 13, a sleeve 14, a housing element 15, a spring element 16, a cylindrical element 17, and contact elements 18. The cover frame 13 is implemented as a U-shaped frame element and comprises a central through bore 19 for passing through the cylindrical element 17, and secondary bores 20 for fastening the housing element 15. The cover frame 13 and the housing element 15 form a housing unit. In an alternative embodiment, the cover frame 13 and the housing element 15 can also be implemented in one piece as an injection moulded component.

The sleeve 14 is attached to the cover frame 13 coaxially to the central through bore 19. Two curved slots 21 are formed in the lateral surface of the sleeve 14 on opposite regions of the lateral surface as guide grooves that act as a guide for guide elements attached to the cylindrical element 17.

As illustrated in FIG. 6a, the spring 16, the cylindrical element 17, the contact elements 18, and the pin 22 form a sliding unit that is retained in the sleeve 14 so as to be rotatable about the longitudinal axis in the vertical direction. The contact elements 18 may be implemented as rod-shaped elements that extend from the cylindrical element 17 in the vertical direction relative to the longitudinal axis. The contact elements 18 each include a contact rocker 23 at an end region thereof that extend radially therefrom relative to the longitudinal axis. The separation or spacing between the contact rockers 23 corresponds to the separation or spacing between the grooves 8 or the contact strips 9 in this case. The contact elements 18 are composed of an electrically conductive material such as copper. Of course, a different electrically conductive material can also be used.

At an upper end region thereof, the contact elements 18 form plug contacts for electrical connection to corresponding electrical loads of the vehicle seat. It is possible to make the upper end region a plug (socket) so that a socket (plug) is directly connected to the component. The contact elements 18 extend in the vertical direction through the cylindrical element 17. The cylindrical element is composed of a thermoplastic plastic material such as of a polybutylene terephthalate (PBT). In a central section of the cylindrical element 17 a cylindrical pin 22 is passed transversely through the cylindrical element 17. The end regions of the pin 22 protrude out of the lateral surface of the cylindrical element 17 and form the guide elements. The cylindrical element 17 and the cylindrical pin 22 can also be made in one piece of an injection moulded material in an alternative embodiment. The cylindrical element 17 is implemented with an annular section on which the spring element 16, which is embodied as a coil spring, is retained.

From the assembly of the contact socket 3 it can be recognized that the sliding unit plugs through the sleeve 14 and is retained and guided via the guide elements in the guide grooves under spring bias. Furthermore, the slider unit is accommodated in a housing element 15 that is also made of a plastic material. The housing element 15 is implemented with a receiving bore for this purpose and comprises lateral recesses on both sides, which accept the pairs of contact rockers 23 that pivot into the housing element 15 upon removal of the vehicle seat from the rail system.

Figure 3A:
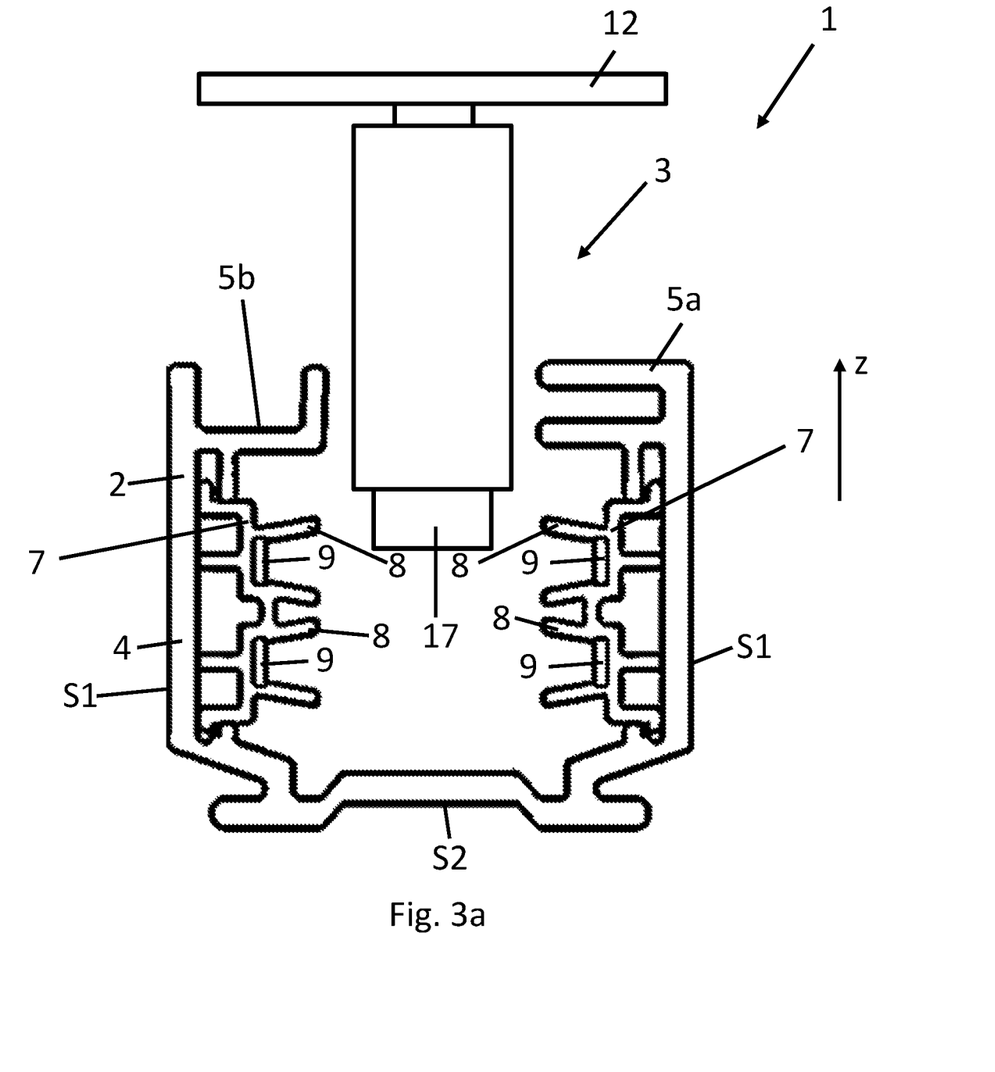
FIGS. 3a to 3c illustrate cross-sectional views of an insertion of a contact socket into the contact rail in three steps, in accordance with embodiments.
Figure 3B:
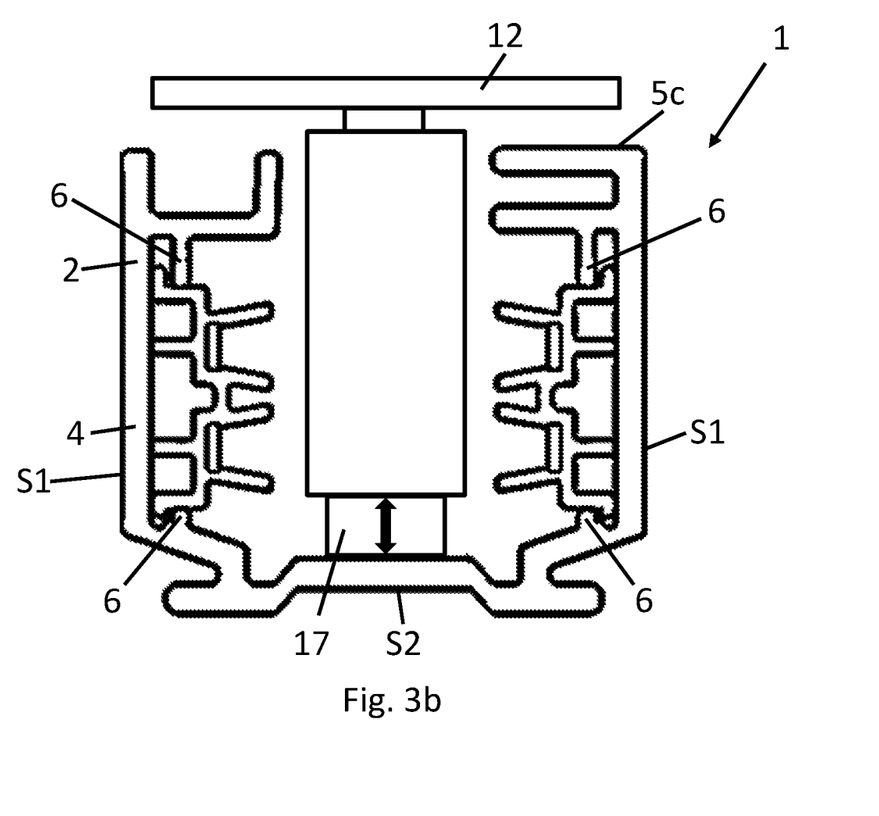
Figure 3C:
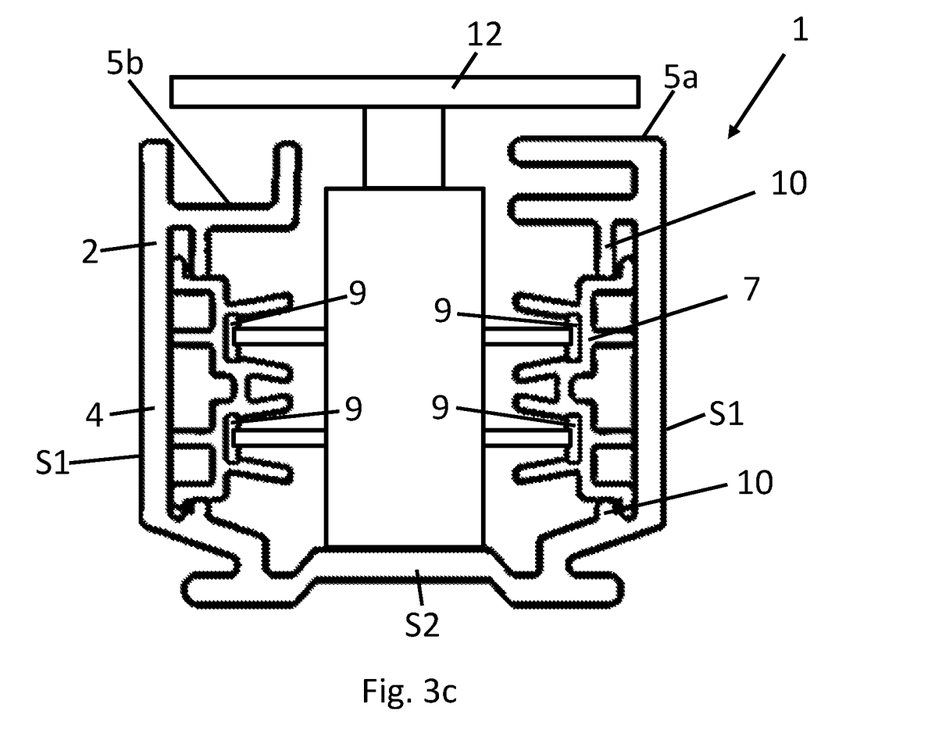

As illustrated in FIGS. 3a to 3c, the process of electrical connection between the motor vehicle seat and the vehicle electrical system is shown schematically in three steps or process blocks.

FIG. 3a illustrates the insertion of a vehicle seat via the contact socket 3 in the contact rail 2. In this case, the contact socket 3 is attached to the underside of the structure of the seat 12, the structure of the seat 12 being represented by way of example very schematically as a plate-shaped element. The insertion of the contact socket 3 into the contact rail 2 is represented by the arrow (vertical direction). From the situation illustrated in FIG. 3a, it can be seen that the cylindrical element 17 protrudes out of the housing unit via the downward facing end region thereof with a length L1 and is spaced apart from the bridge piece S2. Furthermore, the cylindrical element 17 is retained in the housing unit and the sleeve 14 such that the two pairs of contact rockers 23 are positioned essentially within the opposing accommodation spaces of the housing unit. This is achieved by the biased spring element 16, which ensures that the pairs of contact rockers always fold into the housing unit when the contact socket 3 is spaced apart from the bridge piece S2. This enables the contact socket 3 to be inserted from above into the contact rail and through the gap between the sections 5a, 5b.

In FIG. 3b, with further lowering of the vehicle seat, the underside of the cylindrical element 17 meets the bridge piece S2 of the contact rail. In this position, the pairs of contact rockers 23 are already oriented to the contact rail in the z-direction. As represented by the double arrow in FIG. 3b, with further lowering of the motor vehicle seat, a forced helical movement is now carried out between the cylindrical element 17 and the sleeve 14 (slot guide pin 22/slot 21). As a result, the cylindrical element 17 turns about the longitudinal axis thereof, in which the pairs of contact rockers 23 are rotated relative to the contact rail. Furthermore, at the same time, a superimposed translational and rotational movement occurs between the cylindrical element 17 and the housing unit.

FIG. 3c illustrates the fully lowered end position of the vehicle seat. With the motor vehicle seat fully lowered, the pairs of contact rockers 23 are pivoted out of the housing unit and the contact rockers of the pairs of contact rockers 23 contact the corresponding contact strips, whereby an electrical connection is made.

Figure 5A:
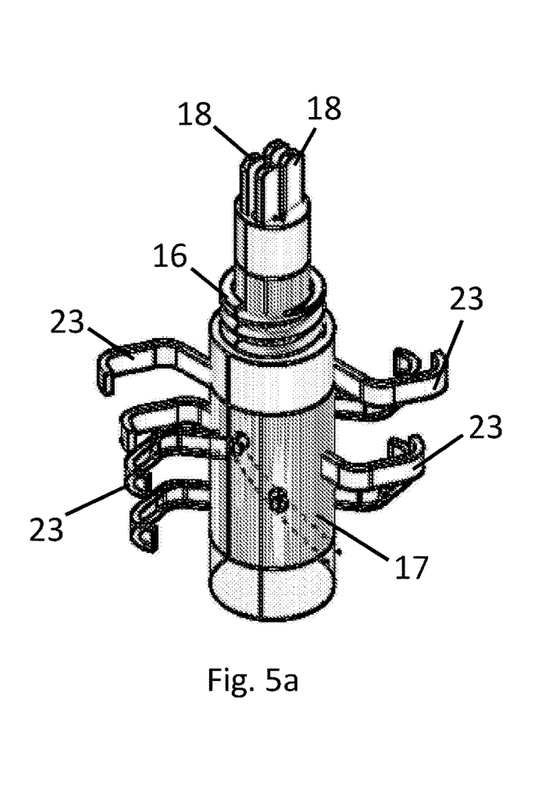
FIGS. 5a and 5b illustrate a perspective view and a top view of a sliding unit of the contact socket in different positions, in accordance with embodiments.
Figure 5B:
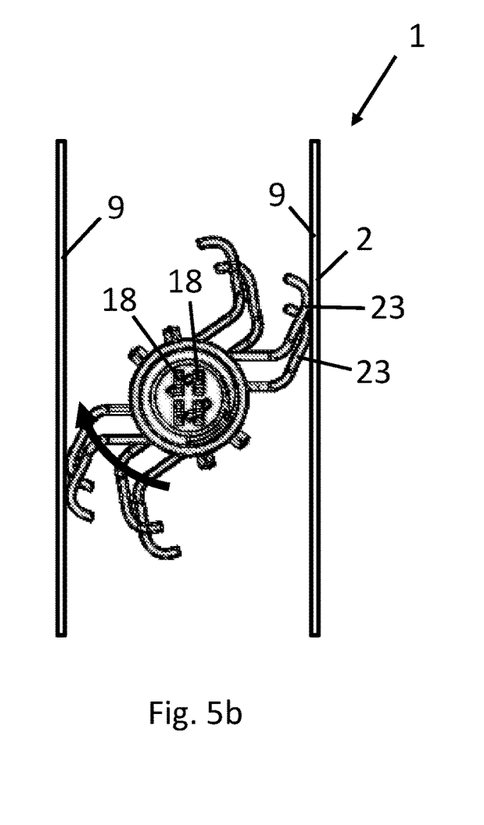

In FIG. 5b, the pivoting out of the pairs of contact rockers 23 (rotation of the cylindrical element 17) is represented by the arrow. The top view shows different positions of the contact rockers starting from a position fully pivoted into the housing unit up to the position in which the contact rockers are electrically connected to the contact strips 9.

FIGS. 4a through 4d likewise illustrate the lowering movement of the vehicle seat for the purpose of contact the contact socket 3 in the contact rail 2. In the perspective representations, the housing element 15 is absent, so that the view of the positive guidance of the cylindrical element 17 in the sleeve 14, i.e., the guiding of an end region of the pin 22 in a curved slot 21, may be seen.

Figure 4A:
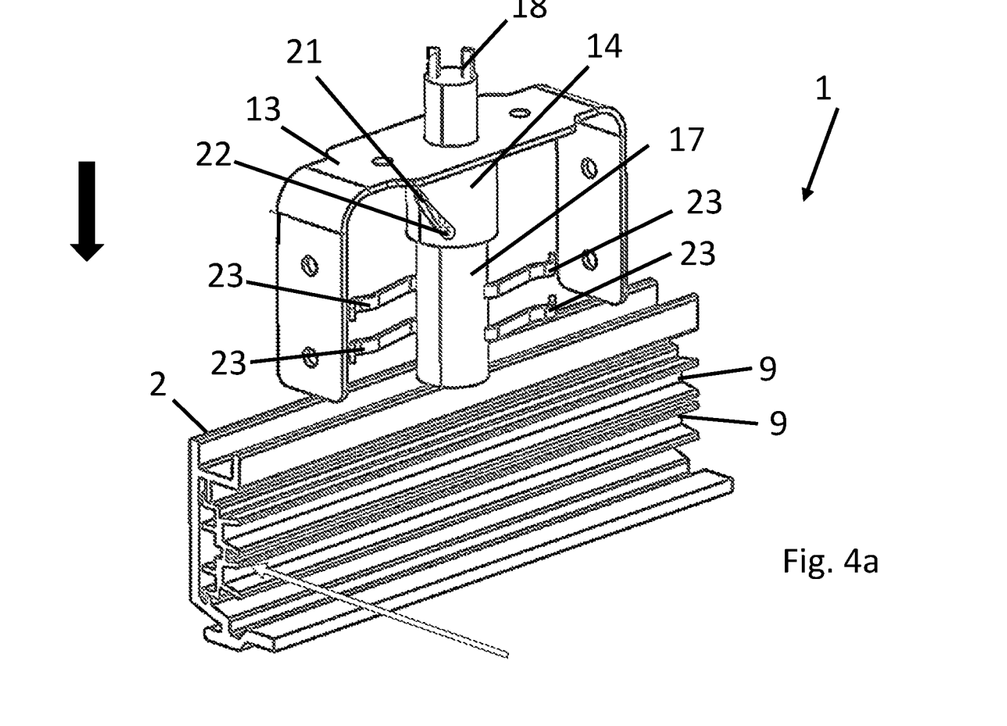
FIGS. 4a to 4g illustrate perspective views of the insertion and removal of the contact socket in the contact rail in multiple steps, in accordance with embodiments.
Figure 4B:
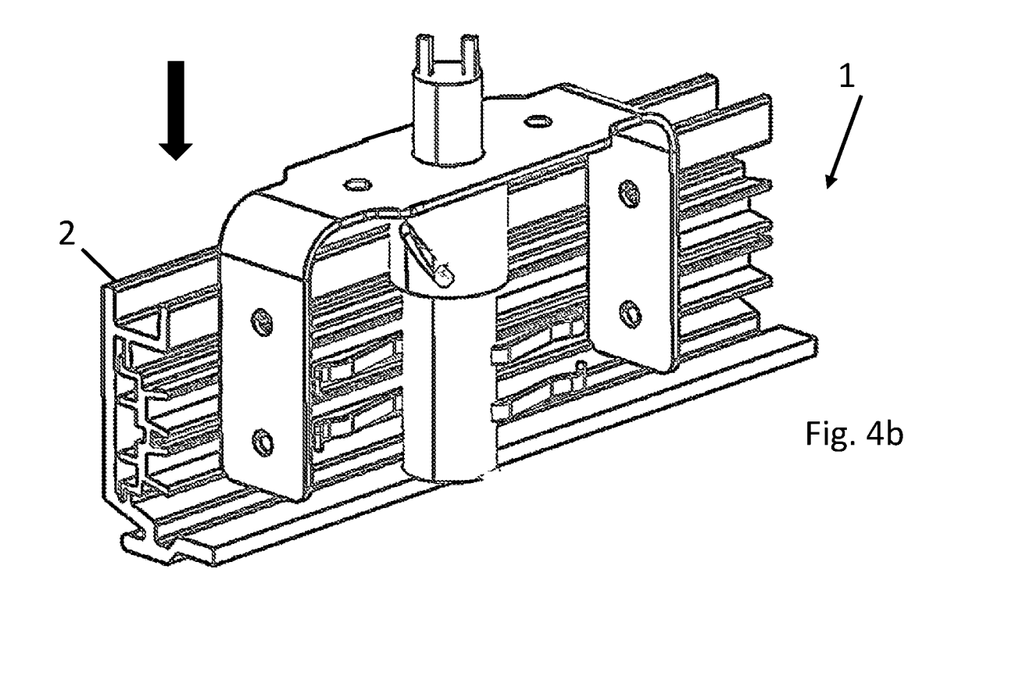
Figure 4C:
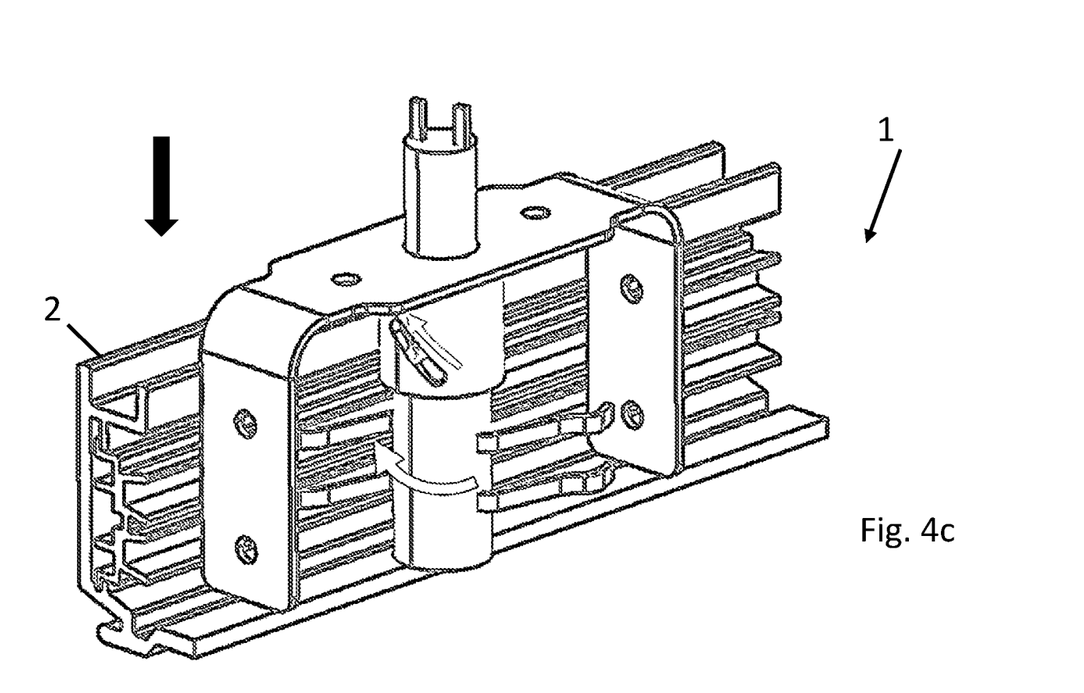
Figure 4D:
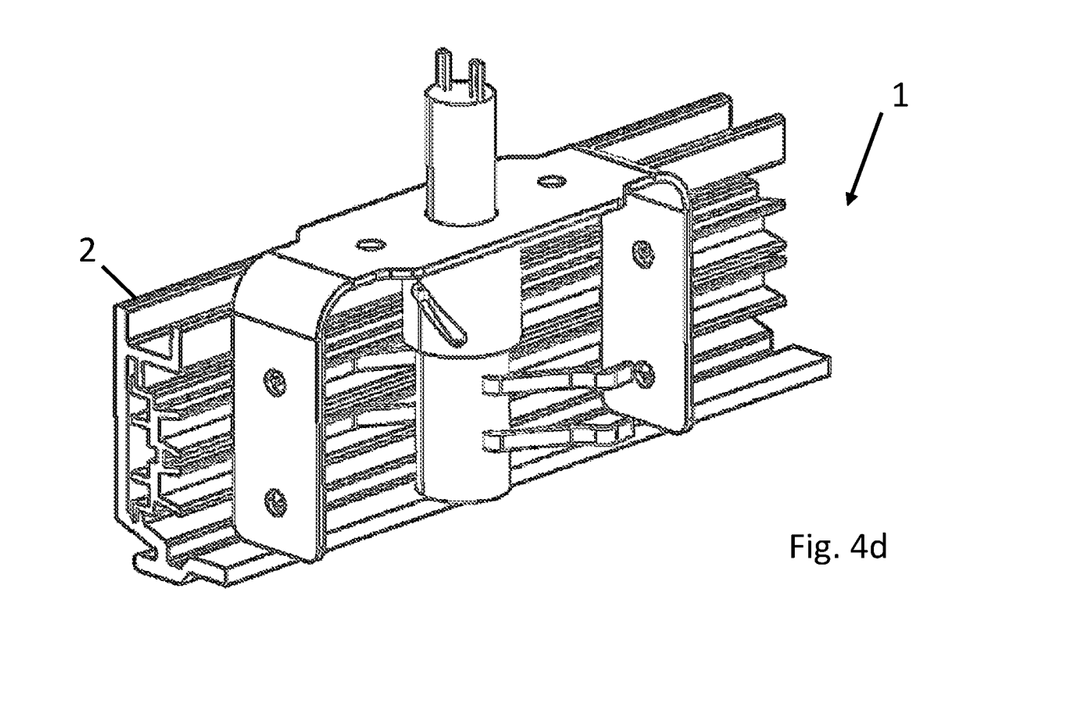
Figure 4E:
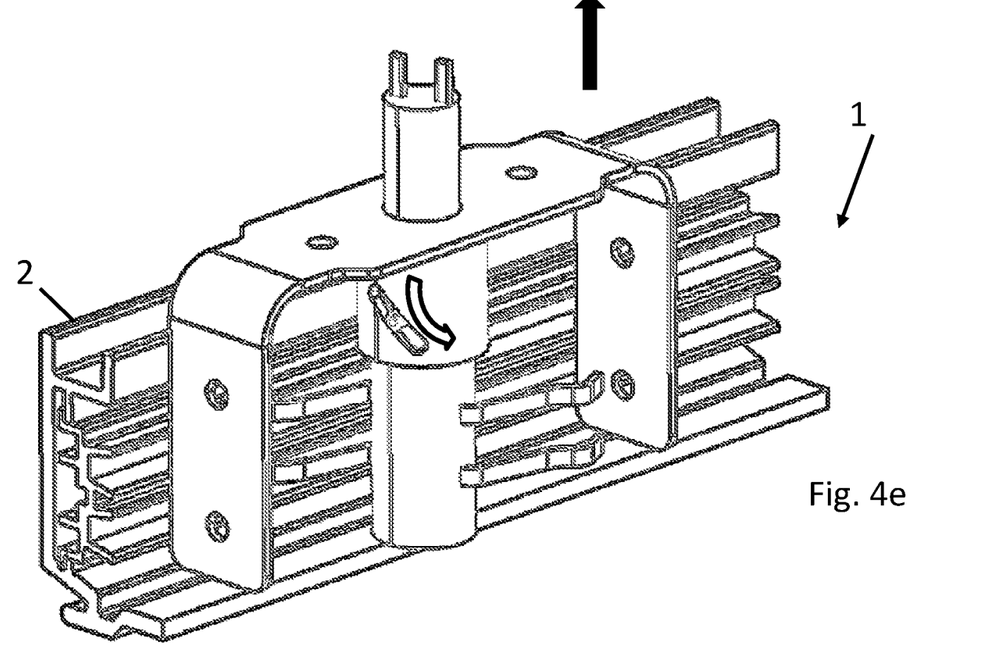
Figure 4F:
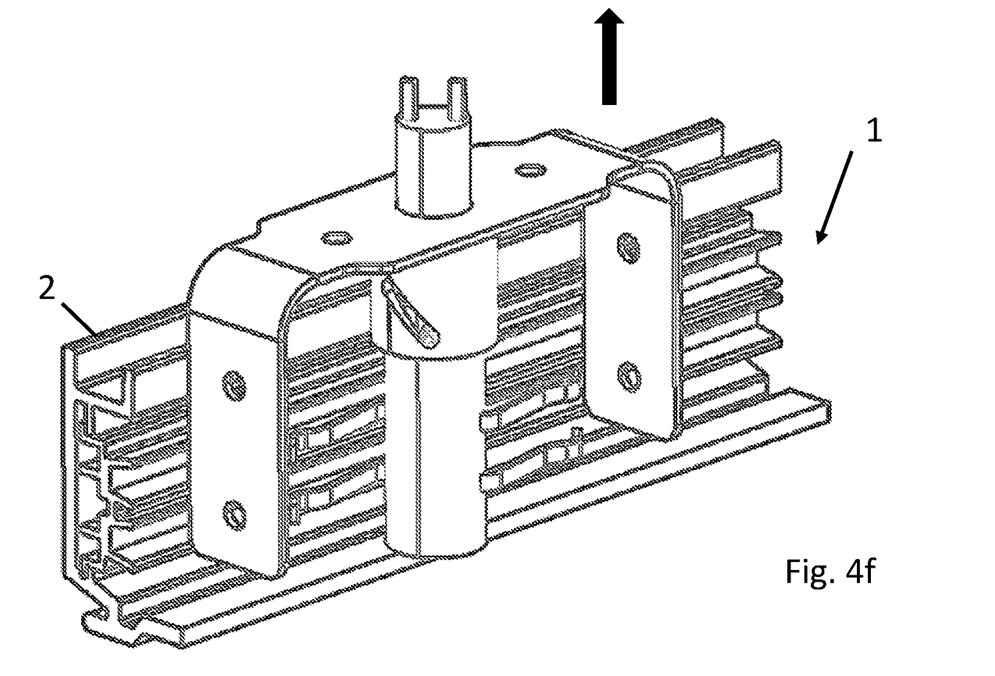
Figure 4G:
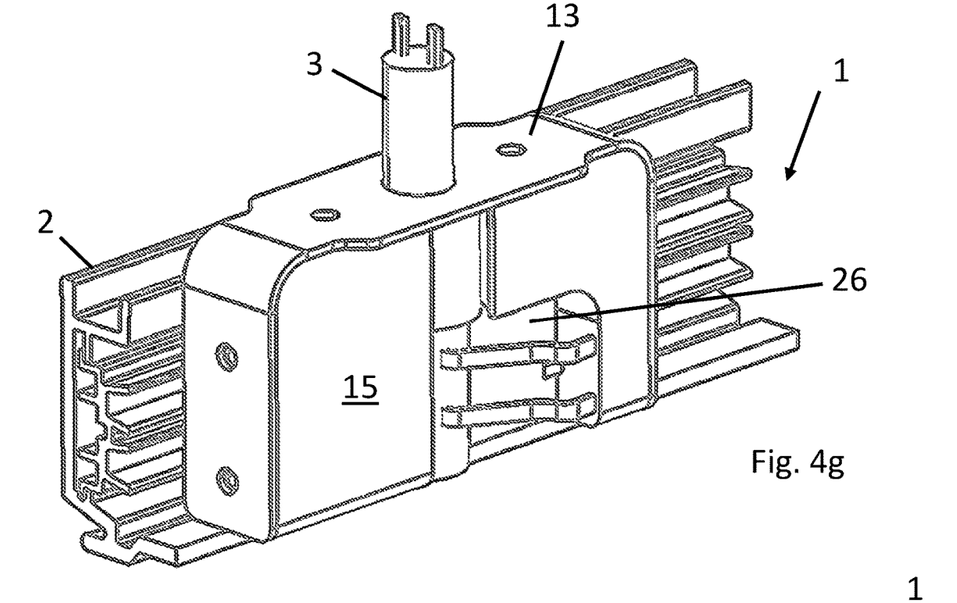

Starting from the position illustrated in FIG. 4d in which the motor vehicle seat is inserted in the rail system and the contact element is in contact with the contact rail, in FIGS. 4e to 4g steps or process blocks during removal of the vehicle seat from the rail system and releasing the contact are illustrated.

When removing the vehicle seat after releasing the locking in the rail system, the cylindrical element 17 of the sliding unit is moved back into the initial position, starting from the position illustrated in FIG. 4d, by the spring pretension of the coil spring between the cylindrical element 17 and the housing unit via the end regions of the pin 22 forcibly guided along the slots 21, whereupon the pairs of contact rockers 23 are released from the contact strips 9 and retained in the housing unit. This ensures that the pairs of contact rockers are always folded in during removal of the vehicle seat.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 contact system
2 contact rail 3 contact socket
4 support rail
5a,5b legs
5c stop surface
6 retaining strips
7 insulation profiles
8 grooves
9 contact strips
11 guide grooves
12 structure of the seat
13 cover frame
14 sleeve
15 housing element
16 spring element
17 cylindrical element
18 contact element
19 through bore
20 bore
21 slot
22 pin
23 contact rocker
S1 leg
S2 bridge piece

What is claimed is:

1. A contact system to establish an electrical connection between a vehicle electrical system and a vehicle seat that is removeably retained in guide rails, the contact system comprising:
a contact rail having at least two contact strips;
at least one contact socket attached to the vehicle seat and configured to be received by the contact rail, the at least one contact socket having a sliding unit with contact elements movably retained in a housing unit, wherein:
a relative movement between the sliding unit and the housing unit is carried out to establish the electrical connection between the vehicle electrical system and the vehicle seat when the vehicle seat is retained in the guide rails, and by which electrical contact between current contact elements of the vehicle seat and the contact strips is made via the contact elements, the relative movement being a combined rotational movement and a translational movement in which the rotational movement is carried out as a function of the translational movement and is a helical rotary movement between the sliding unit and the housing unit, and
removal of the electrical contact is achieved upon removal of the vehicle seat from the guide rails.

2. The contact system of claim 1, wherein the contact rail is fixedly attached to the body of the motor vehicle parallel to the guide rails.

3. The contact system of claim 1, wherein the contact rail is integrated with one of the guide rails.

4. The contact system of claim 1, wherein:
the housing unit comprises a cylindrical sleeve having a guide groove in a lateral surface thereof,
the sliding unit comprises a cylindrical element composed of a plastic material, and
a guide element is disposed on the cylindrical element, the guide element being configured to engage in the guide groove such that the relative movement is to be carried out forcibly.

5. The contact system of claim 4, wherein the contact elements extend in a vertical direction through the cylindrical element.

6. The contact system of claim 1, wherein the contact elements comprise rod-shaped elements composed of an electrically conductive material.

7. The contact system of claim 6, wherein the contact elements have at least one contact rocker disposed on a lower end region thereof for electrical connection to the contact strips.

8. The contact system of claim 1, wherein the contact rail comprises a support rail having a U-profile with legs, a bridge piece joining the legs, each leg having insulation profiles upon which the contact strips are disposed, the insulation profiles being composed of a plastic material.

9. The contact system of claim 8, wherein the insulation profiles are retained in guide grooves on the support rail.

10. The contact system of claim 8, wherein the insulation profiles each comprise a pair of grooves extending spaced apart from each other in a vertical direction.

11. The contact system of claim 10, wherein each groove is to receive a corresponding one of the contact strips.

12. A contact system for a motor vehicle, the system comprising:
a contact rail having at least one contact strip configured for electrical connection to an electrical system of the motor vehicle; and
a contact socket attached to a seat of the motor vehicle, the contact socket having a sliding unit with at least one contact element to establish electrical communication with the seat, and a contact rocker extending radially from the at least one contact element to establish electrical communication with the contact strip,
wherein the sliding unit is configured to have relative movement to establish an electrical connection between the vehicle electrical system and the vehicle seat upon mounting of the seat in the vehicle, by which electrical contact between current contact elements of the vehicle seat and the contact strip is made via the contact elements.

13. The contact system of claim 12, wherein:
the housing unit comprises a cylindrical sleeve having a guide groove in a lateral surface thereof,
the sliding unit comprises a cylindrical element composed of a plastic material, and
a guide element is disposed on the cylindrical element, the guide element being configured to engage in the guide groove such that the relative movement is to be carried out forcibly.

14. The contact system of claim 13, wherein the contact elements extend through the cylindrical element.

15. The contact system of claim 12, wherein the contact elements comprise rod-shaped elements composed of an electrically conductive material.

16. The contact system of claim 12, wherein the contact rail comprises a support rail having a U-profile with legs, a bridge piece joining the legs, each leg having insulation profiles upon which the contact strips are disposed, the insulation profiles being composed of a plastic material.

17. The contact system of claim 16, wherein the insulation profiles are retained in guide grooves on the support rail.

18. The contact system of claim 12, wherein the insulation profiles each comprise a pair of grooves extending spaced apart from each other.

19. The contact system of claim 18, wherein each groove is to receive a corresponding one of the contact strips.

20. A method for electrically connecting a removable vehicle seat to a vehicle electrical system of a motor vehicle, the method comprising:

providing a contact system that includes a contact rail having at least two contact strips connected to the vehicle electrical system, at least one contact socket attached to the vehicle seat, the at least one contact socket having a sliding unit with contact elements and a cylindrical element movably retained in a housing unit;

inserting the vehicle seat in a floor rail, such that the contact socket is inserted into the contact rail;

lowering the vehicle seat until the cylindrical element of the contact socket encounters a stop and is oriented in a vertical direction in relation to the contact rail; and further lowering the vehicle seat such that when lowering the housing unit, the cylindrical element is rotated and during such rotation, electrical connection between the contact elements and the contact rail is established.

* * * * *